(12) United States Patent
Osakabe et al.

(10) Patent No.: US 9,013,769 B1
(45) Date of Patent: Apr. 21, 2015

(54) IMAGE READING DEVICE CONVEYING ORIGINAL SHEET THROUGH ONE OF FIRST PATH AND SECOND PATH

(71) Applicant: Brother Kogyo Kabushiki Kaisha, Nagoya-shi, Aichi-ken (JP)

(72) Inventors: Yoshinori Osakabe, Seto (JP); Atsushi Yokochi, Chiryu (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/506,880

(22) Filed: Oct. 6, 2014

(51) Int. Cl.
 *H04N 1/04* (2006.01)
 *H04N 1/203* (2006.01)
 *H04N 1/00* (2006.01)

(52) U.S. Cl.
 CPC ......... *H04N 1/2034* (2013.01); *H04N 1/00588* (2013.01); *H04N 1/00599* (2013.01); *H04N 2201/0466* (2013.01); *H04N 2201/0081* (2013.01)

(58) Field of Classification Search
 CPC ............ H04N 1/2034; H04N 1/00588; H04N 1/00599; H04N 2201/0466; H04N 2201/0081
 USPC ................................... 358/498, 497, 496, 474
 See application file for complete search history.

(56) References Cited

U.S. PATENT DOCUMENTS

| 2008/0013133 A1* | 1/2008 | Taguchi | 358/514 |
| 2010/0220345 A1* | 9/2010 | Morikawa | 358/1.13 |

FOREIGN PATENT DOCUMENTS

| JP | 2007-082033 A | 3/2007 |
| JP | 2013-052929 A | 3/2013 |

\* cited by examiner

*Primary Examiner* — Houshang Safaipour
(74) *Attorney, Agent, or Firm* — Merchant & Gould PC (57) ABSTRACT

In a conveyor of an image-reading device, a first path is defined by a path from the upper path to the lower path via the curved path. A second path is defined by a path from the upper path to the extension path. A first reading unit is disposed on the upper path and reads the first surface while the original sheet is on the upper path. A second reading unit is disposed on the upper path and reads the second surface while the original sheet is on the upper path. A third reading unit is disposed on the lower path and reads the second surface while the original sheet is on the lower path. When the reading section reads the original sheet, the conveyor conveys the original sheet through the first path or the second path.

20 Claims, 7 Drawing Sheets

IMAGE READING DEVICE CONVEYING ORIGINAL SHEET THROUGH ONE OF FIRST PATH AND SECOND PATH

CROSS REFERENCE TO RELATED APPLICATION

This application claims priority from Japanese Patent Application No. 2013-209822 filed Oct. 7, 2013. The entire content of the priority application is incorporated herein by reference.

TECHNICAL FIELD

The following disclosure relates to an image reading device.

BACKGROUND

There has been known an image-reading device comprises a conveying unit and a reading unit.

The conveying unit defines a first conveying path and a second conveying path. The first conveying path includes an upper path, a lower path positioned below the upper path, and a curved path connecting the upper path to the lower path. The second conveying path includes the lower path, and an extension path that is connected to the lower path and branches linearly in a direction different from the curved path.

The reading unit reads images from sheets conveyed along the first conveying path and second conveying path. More specifically, the reading unit has a first reading unit and a second reading unit. The first reading unit is disposed on the lower path and can read a first surface of a sheet conveyed along the lower path. The second reading unit is also disposed on the lower path and can read a second surface on the opposite side of the first surface of a sheet conveyed along the lower path. The first and second reading units are disposed at the same position along the lower path but on opposite sides (i.e., one above and one below).

In this conventional image-reading device, the conveying unit conveys sheets either along the first conveying path so that the sheets pass from the lower path to the upper path via the curved path, or along the second conveying path so that the sheets pass from the lower path onto the extension path. During this conveying process, the reading unit can read images from one or both surfaces of a sheet conveyed along the lower path, with the first reading unit reading an image from the first surface of the sheet and the second reading unit reading an image from the second surface of the sheet. The first conveying path is used for reading images from relatively thin sheets that can be conveyed along the curved path, and the second conveying path is used for reading images from thicker sheets that are not suitable for the curved path, for example.

SUMMARY

The conventional image-reading device described above is configured to read images from conveyed sheets while being able to switch the path along which the sheets are conveyed between the first conveying path and the second conveying path, thereby being able to meet more user needs by being able to read images from sheets having different characteristics. However, in an effort to make the conventional device more compact, the first reading unit and the second reading unit disposed on opposing sides of the conveying path must be disposed in positions very near each other. Further, when this conventional image-reading device reads images from both surfaces of the sheet, both the first and second reading units operate simultaneously. Consequently, the light emitted from one of the first and second reading units may affect the other reading unit and there is a possibility that the suitable circumstance for reading images cannot be given.

Accordingly, an aspect of the disclosure relates to an image-reading device capable of producing images consistent quality when reading sheets while sufficiently meeting user needs by providing first and second conveying paths.

In one aspect of the disclosure, the image-reading device may include a conveyor and a reading section. The conveyor may be configured to convey an original sheet having a first surface and a second surface opposite to the first surface, the conveyor may have an upper path, a lower path, a curved path, and an extension path. The lower path may be disposed below the upper path. The curved path may connect the upper path and the lower path. The extension path may be connected to the upper path. The upper path may branch to the curved path and the extension path. A first path may be defined by a path from the upper path to the lower path via the curved path. A second path may be defined by a path from the upper path to the extension path. The reading section may be configured to read the original sheet and may have a first reading unit, a second reading unit, and a third reading unit. The first reading unit may be disposed on the upper path and configured to read the first surface while the original sheet is on the upper path. The second reading unit may be disposed on the upper path and configured to read the second surface while the original sheet is on the upper path. The third reading unit may be disposed on the lower path and configured to read the second surface while the original sheet is on the lower path. When the reading section reads the original sheet, the conveyor may convey the original sheet through the first path or the second path.

In another aspect of the disclosure, the image-reading device may include a conveyor, and a reading section. The conveyor may be configured to convey an original sheet having a first surface and a second surface opposite to the first surface. The conveyor may have an upper path, a lower path, and an extension path. The lower path may be disposed below the upper path. The curved path may connect the upper path and the lower path. The extension path may be connected to the lower path. The upper path may branch to the curved path and the lower path. A first path may be defined by a path from the lower path to the upper path via the curved path. A second path may be defined by a path from the lower path to the extension path. The reading section may have a first reading unit, a second reading unit, and a third reading unit. The first reading unit may be disposed on the lower path and configured to read the first surface while the original sheet is on the lower path. The second reading unit may be disposed on the upper path and configured to read the second surface while the original sheet is on the upper path. The third reading unit may be disposed on the lower path and configured to read the second surface while the original sheet is on the lower path. When the reading section reads the original sheet, the conveyor may convey the original sheet through the first path or the second path.

In another aspect of the disclosure, an image-reading device comprising may include a conveyor, and a reading section. The conveyor may be configured to convey an original sheet. The conveyor may have a common path, a curved path, a first path, and a second path. The curved path may be connected to the common path. The first path may be connected to the curved path. At least a part of the first path may overlap with at least a part of the common path with respect to a vertical direction. The second path may be connected to the common path and may extend in a direction different from the curved path from the common path. The conveyor may selectively perform a first conveyance and a second conveyance. In the first conveyance the original sheet is conveyed from the common path to the first path via the curved path, and in the second conveyance the original sheet is conveyed from the common path to the second path. The reading section may be configured to read the original sheet and may have a first reading unit, a second reading unit, and a third reading unit. The first reading unit and the second reading unit may be positioned with the common path interposed therebetween, and displaced in a direction in which the original sheet is conveyed, the first reading unit and the second reading unit reading the original sheet on the common path. The third reading unit may be disposed on the first path.

BRIEF DESCRIPTION OF THE DRAWINGS

The particular features and advantages of the present disclosure as well as other objects will become apparent from the following description taken in connection with the accompanying drawings, in which.

DETAILED DESCRIPTION

An image-reading device 1 according to embodiments will be described while referring to the accompanying drawings wherein like parts and components are designated by the same reference numerals to avoid duplicating description.

First Embodiment

Figure 1:
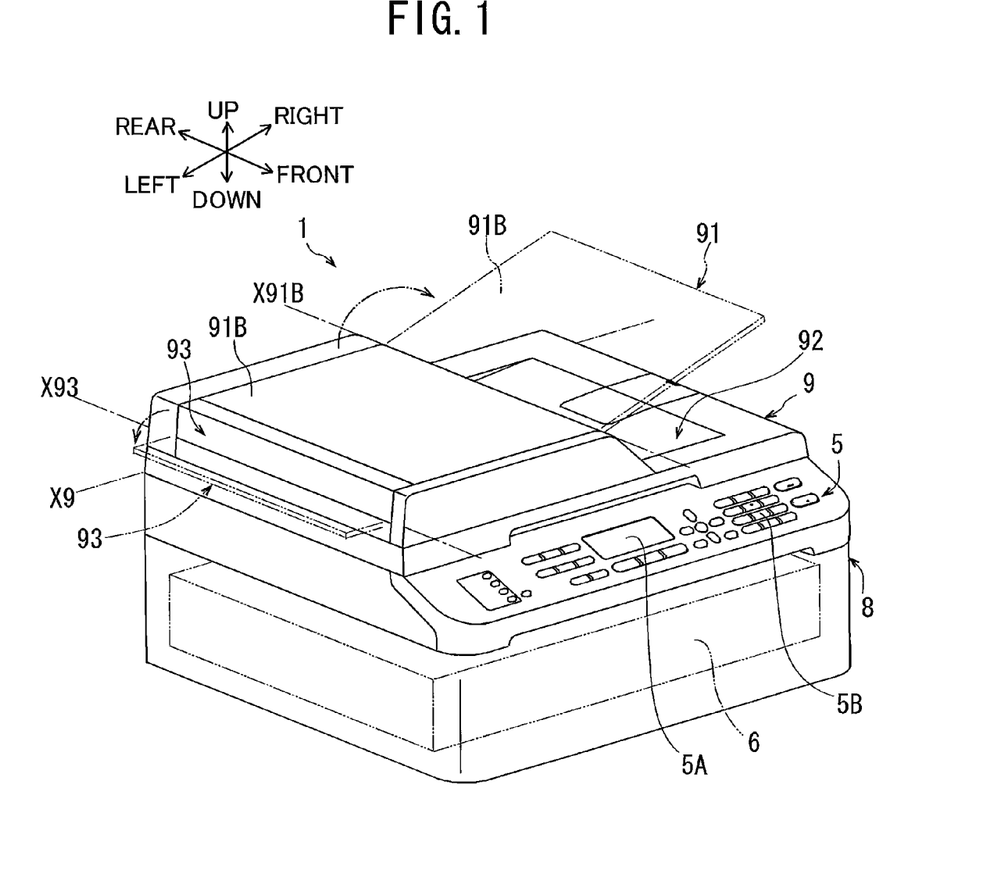
FIG. 1 is a perspective view of an image-reading device according to a first embodiment.

FIG. 1 shows an image-reading device 1 according to a first embodiment. As indicated in FIG. 1, the side of the image-reading device 1 on which an operating panel 5 is provided will be defined as the front side, and the side of the image-reading device 1 to the operator's left when the operator faces the operating panel 5 will be defined as the left side. The terms "upward", "downward", "upper", "lower", "above", "below", "beneath", "right", "left", "front", "rear" and the like will be used throughout the description assuming that the image-reading device 1 is disposed in an orientation in which it is intended to be used. In use, the image-reading device 1 is disposed as shown in FIG. 1. Front, rear, left, right, up, and down directions are indicated by arrows in FIG. 1. Directions shown in all other drawings correspond to the directions indicated in FIG. 1. Next, the various components of the image-reading device 1 will be described with reference to the drawings.

Overall Structure of the Image-Reading Device

As shown in FIGS. 1 through 5, the image-reading device 1 includes a body section 8, and a pivoting section 9. The body section 8 has a flattened box-like shape. As shown in FIG. 1, the operating panel 5 is provided on the front side of the body section 8. An image-forming unit 6 is provided in the bottom of the body section 8. While not shown in the drawings, the image-forming unit 6 accommodates an image-forming mechanism using an inkjet or laser system, for example.

Figure 2:
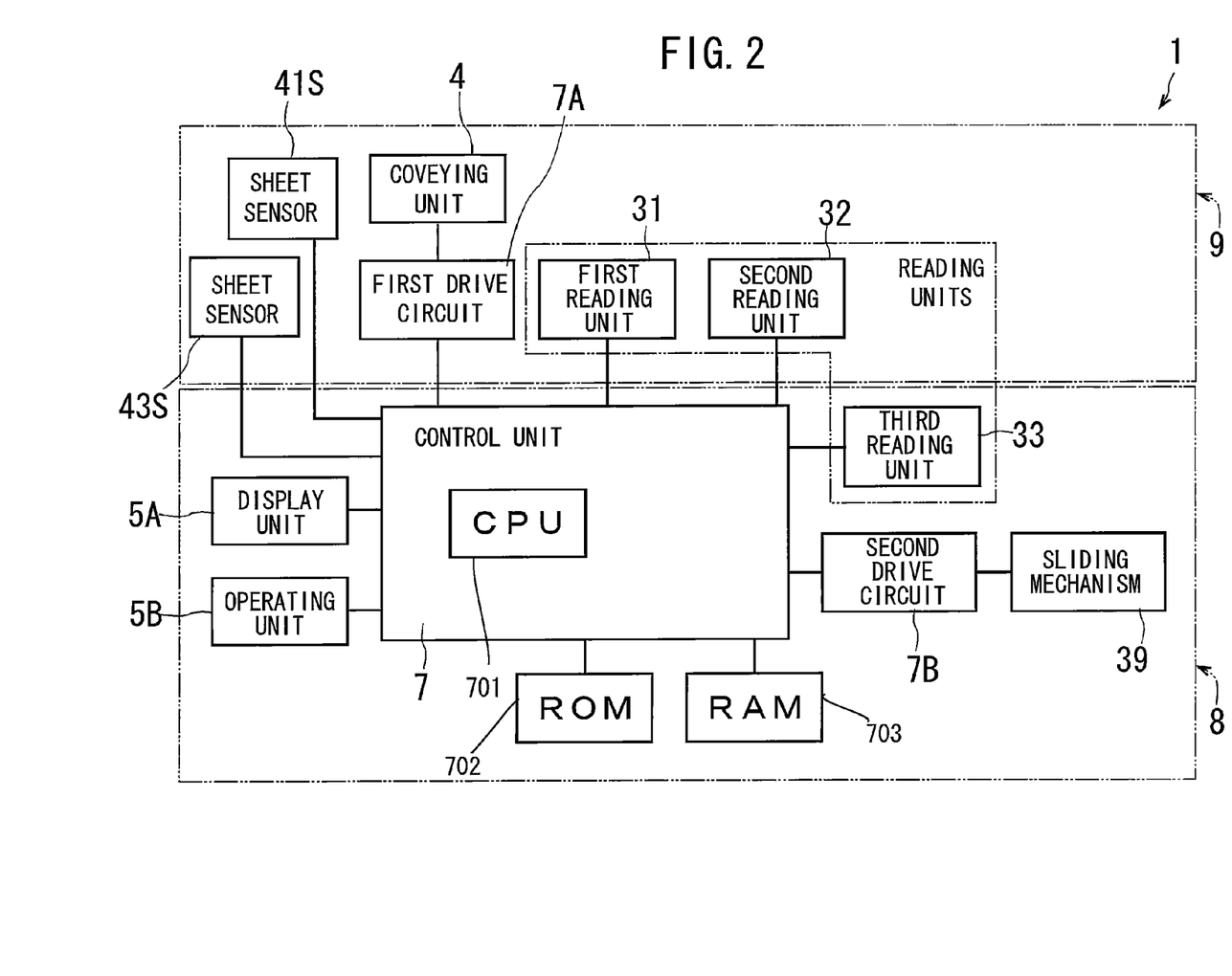
FIG. 2 is a block diagram of the image-reading device according to the first embodiment.
Figure 3:
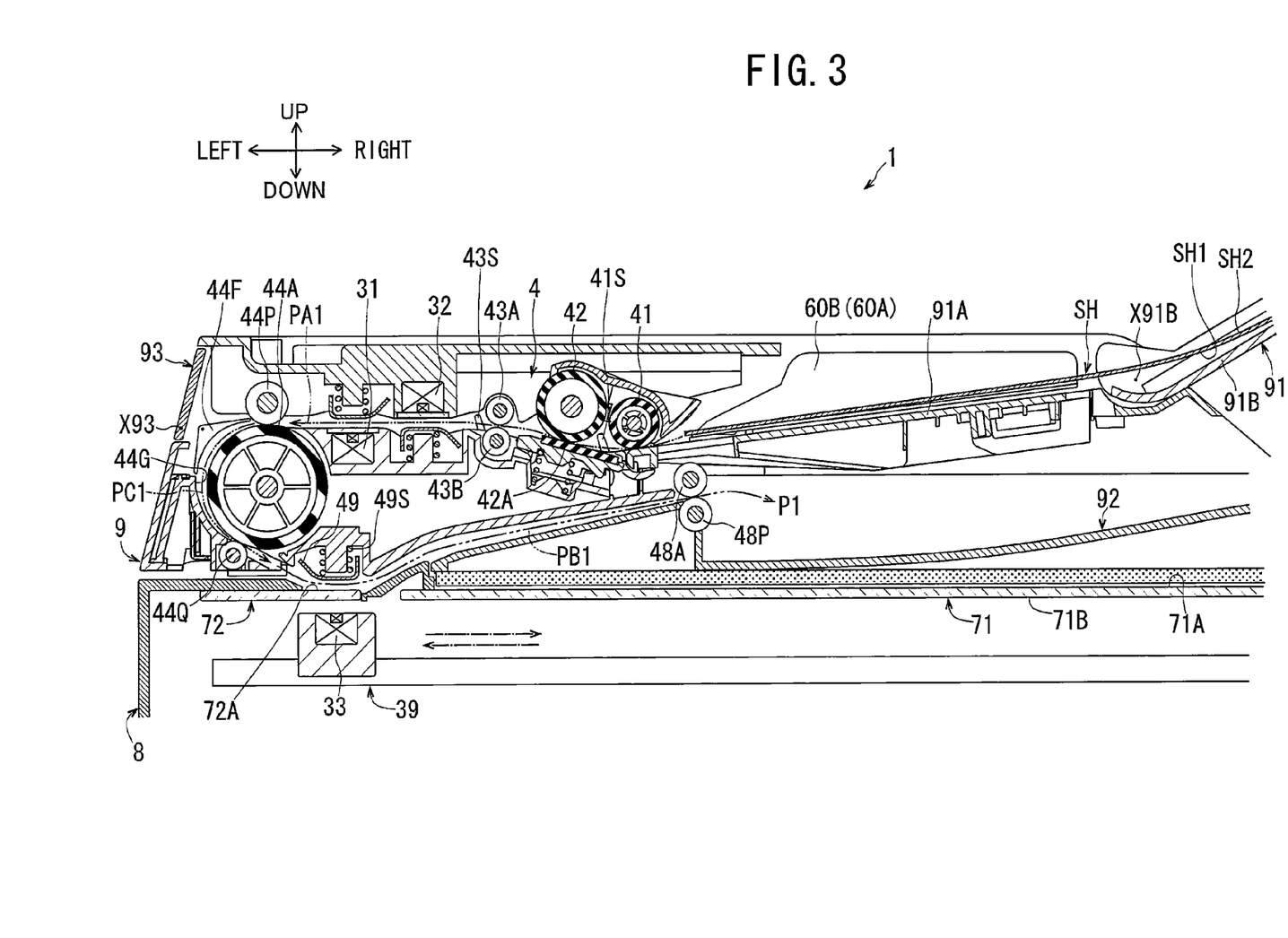
FIG. 3 is a cross-section illustrating a conveying unit, reading units, and a first conveying path according to the first embodiment.
Figure 4:
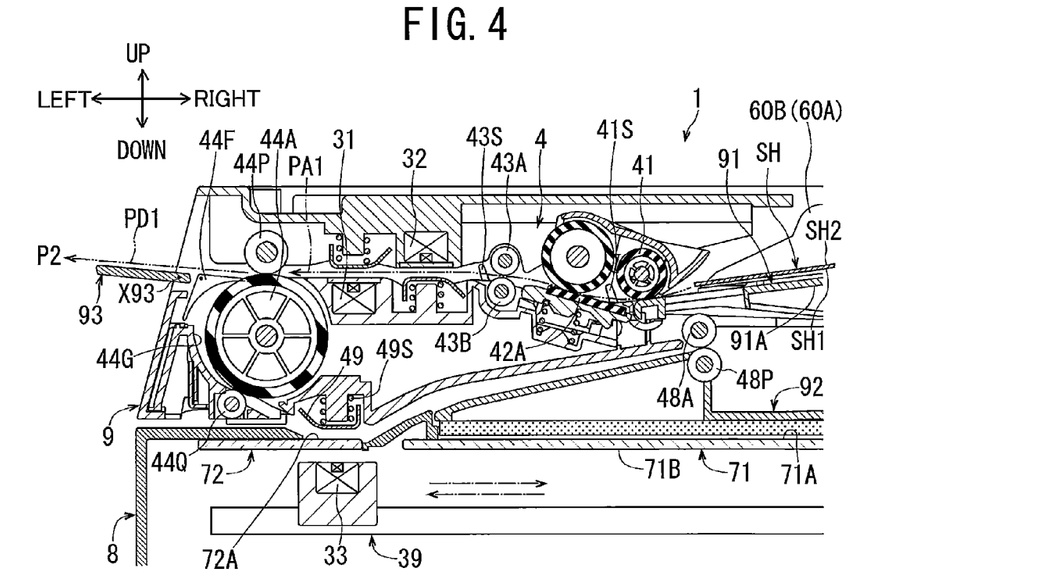
FIG. 4 is a cross-section illustrating the conveying unit, the reading units, and a second conveying path according to the first embodiment.

As shown in FIGS. 2 through 4, the image-reading device 1 includes a conveying unit 4, reading units (described below), a sliding mechanism 39, and a control unit 7. The conveying unit 4 is provided in the pivoting section 9 and has defined therein a first conveying path P1 shown in FIG. 3, and a second conveying path P2 shown in FIG. 4. As shown in FIGS. 2 through 4, the reading units include a first reading unit 31 and a second reading unit 32 provided in the pivoting section 9, and a third reading unit 33 provided in the body section 8. The sliding mechanism 39 is provided in the upper portion of the body section 8. As shown in FIG. 2, the control unit 7 is also provided inside the body section 8.

As shown in FIGS. 3 and 4, a first platen glass 71 and a second platen glass 72 are arranged on the top surface of the body section 8. The first platen glass 71 is an example of the supporting part. The top surface of the first platen glass 71 constitutes a supporting surface 71A. The supporting surface 71A supports an original from the below when the image-reading device 1 reads images while the original is stationary. The original in this case may be anything from paper, transparencies, books and the like. The second platen glass 72 is positioned on the left side of the first platen glass 71 and has a narrow left-right dimension while being elongated in the front-rear direction. The top surface of the second platen glass 72 constitutes a reading surface 72A. When the image-reading device 1 conveys and reads a plurality of sheets SH, the conveyed sheets SH pass over the reading surface 72A while in contact with the same.

As shown in FIG. 1, the pivoting section 9 is supported on the body section 8 by hinges (not shown) provided at the top edge on the rear surface of the body section 8 so as to be capable of pivoting about a pivoting axis X9 oriented in the left-right direction. When in its closed state, the pivoting section 9 covers the supporting surface 71A from the above. While not shown in the drawings, the pivoting section 9 opens above the supporting surface 71A by pivoting the pivoting section 9 about the axis X9 from the closed state shown in FIG. 1 so that the front end of the pivoting section 9 is displaced upward and rearward. While the pivoting section 9 is in this open state, the user can place an original to be read by the image-reading device 1 on the supporting surface 71A.

As shown in FIGS. 1, 3, and 4, the pivoting section 9 is further provided with a paper tray 91, a discharge tray 92, and a discharge cover 93.

The paper tray 91 includes a fixed tray part 91A, and a movable tray part 91B. The fixed tray part 91A has a general flat plate shape that extends in front-rear and left-right directions. The fixed tray part 91A is fixed above the center region of the pivoting section 9. The movable tray part 91B is supported on the pivoting section 9 so as to be capable of pivoting about an axis X91B aligned in the front-rear direction near the right edge of the fixed tray part 91A. By pivoting the movable tray part 91B from its closed state indicated by solid lines in FIG. 1 to the right as indicated by double chain lines in FIG. 1, the movable tray part 91B forms a sloped surface that slopes continuously upward and rightward from the fixed tray part 91A, as shown in FIG. 3. When in this state, the paper tray 91 can support sheets SH to be read when conveying and reading a plurality of sheets SH. As shown in FIGS. 3 and 4, the downward-facing surface of a sheet SH supported on the paper tray 91 is called a first surface SH1, while the upward-facing surface of the sheet SH is called a second surface SH2.

Figure 5:
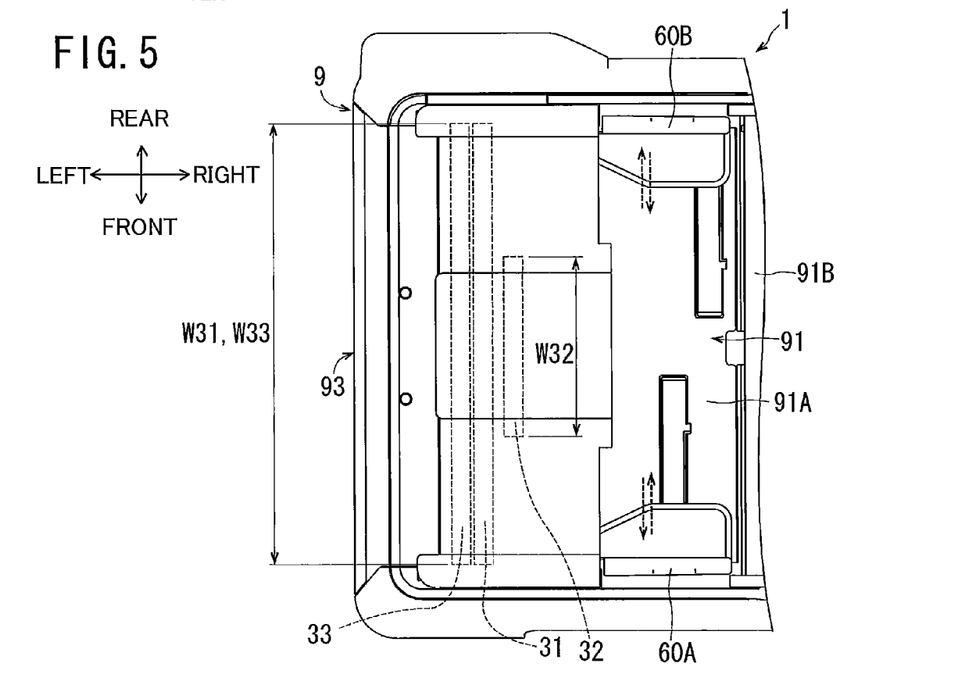
FIG. 5 is a partial top view of a pivoting section according to the first embodiment.

As shown in FIGS. 3 through 5, a pair of guides 60A and 60B is provided on the fixed tray part 91A of the paper tray 91 and are capable of sliding in the front-rear direction. The guides 60A and 60B are aligned with but separate from each other in the front-rear direction. The guides 60A and 60B are interlocked through a rack and pinion mechanism (not shown). By moving the guides 60A and 60B closer to and farther apart from each other, sheets SH of different sizes can be held in place with respect to the front-rear direction when supported on the paper tray 91. With this configuration, the guides 60A and 60B can position the sheets SH on the paper tray 91 such that the center of the sheets SH can be aligned with a front-rear center reference of the paper tray 91.

As shown in FIGS. 1, 3, and 4, the discharge tray 92 is provided in the right side of the pivoting section 9 beneath the paper tray 91. The discharge tray 92 has a flat plate shape that extends in the front-rear and left-right directions. The discharge tray 92 supports sheets SH that the conveying unit 4 conveys along the first conveying path P1.

The discharge cover 93 is supported on the left side of the pivoting section 9 so as to be capable of pivoting about an axis X93 oriented in the front-rear direction. In its closed state shown in FIG. 3, the discharge cover 93 extends almost vertically and constitutes part of the left surface of the pivoting section 9. In its open state shown in FIG. 4, the discharge cover 93 extends almost horizontally toward the left. In this open state, the discharge cover 93 supports the bottoms of sheets SH that the conveying unit 4 conveys along the second conveying path P2.

As illustrated in FIGS. 3 and 4, with the pivoting section 9 closed so as to cover the supporting surface 71A, the conveying unit 4 conveys a sheet SH from the paper tray 91 along the first conveying path P1 and discharges the sheet SH onto the discharge tray 92 or conveys a sheet SH from the paper tray 91 along the second conveying path P2 and discharges the sheet SH onto the open discharge cover 93.

The first conveying path P1 and the second conveying path P2 in the conveying unit 4 are spaces defined by guiding surfaces extended to be able to contact the first surface SH1 and the second surface SH2 of the sheets SH.

As shown in FIG. 3, the first conveying path P1 includes an upper path PA1, a lower path PB1, and a curved path PC1. The upper path PA1 extends substantially horizontally from the paper tray 91 toward the left end of the pivoting section 9. The lower path PB1 is positioned lower than the upper path PA1 and extends from the left side of the pivoting section 9 to the discharge tray 92. More specifically, the lower path PB1 slopes downward from the left side of the pivoting section 9 so as to approach the second platen glass 72, extends rightward in a substantially horizontal direction along the reading surface 72A of the second platen glass 72, and then slopes upward toward the discharge tray 92. The curved path PC1 connects the left end of the upper path PA1 with the left end of the lower path PB1 while curving so as to protrude leftward. The upper path PA1 overlaps with the lower path PB1 in the vertical direction.

When using the first conveying path P1, the conveying unit 4 conveys sheets SH from the upper path PA1 to the lower path PB1 via the curved path PC1. On the first conveying path P1, the sheets SH are conveyed leftward on the upper path PA1, reversed from left to right on the curved path PC1, and conveyed rightward on the lower path PB1. Thus, the right side of the upper path PA1 is the upstream side in the conveying direction, while the right side of the lower path PB1 is the downstream side in the conveying direction. In the description of the embodiment, "the width direction orthogonal to the conveying direction" refers to the front-rear direction.

The conveying unit 4 also includes a feeding roller 41, a sheet sensor 41S, a separating roller 42, and a separating pad 42A along the upper path PA1 at positions near the paper tray 91. The feeding roller 41 feeds sheets SH on the paper tray 91 toward the separating roller 42 positioned downstream in the conveying direction. The sheet sensor 41S detects whether the leading edge of sheets SH on the paper tray 91 have been inserted to a position of contact with the feeding roller 41. The sheet sensor 41S has a well-known structure and, thus, a detailed description will not be given herein. However, an actuator constituting a part of the sheet sensor 41S is positioned downstream of the feeding roller 41 in the conveying direction and is displaced when a sheet SH passes thereby. A sensing unit in the sheet sensor 41S detects displacement of the actuator and outputs a signal to the control unit 7. When the feeding roller 41 feeds a plurality of sheets SH in an overlapped state, the separating roller 42 separates the overlapped sheets SH in cooperation with the separating pad 42A so as to convey one sheet SH at a time downstream in the conveying direction.

The conveying unit 4 also includes a conveying roller 43A, a pinch roller 43B, and a sheet sensor 43S disposed on the upper path PA1 at positions downstream of the separating roller 42 in the conveying direction. The conveying roller 43A and the pinch roller 43B convey sheets SH downstream in the conveying direction after the sheets have been separated by the separating roller 42 and the separating pad 42A. The sheet sensor 43S detects whether the leading edge of a conveyed sheet SH has arrived at a nip position between the conveying roller 43A and the pinch roller 43B. The sheet sensor 43S has the same configuration as the sheet sensor 41S.

The conveying unit 4 also includes a flap 44F, a curved guiding surface 44G, a conveying roller 44A, and pinch rollers 44P and 44Q disposed along the curved path PC1. The flap 44F is an example of a switching unit. The flap 44F can pivot between the state shown in FIG. 3 and the state shown in FIG. 4. In the state shown in FIG. 3, the flap 44F forms a continuous curved surface with the guiding surface 44G. In the state shown in FIG. 4, one end of the flap 44F is moved to a position closer to the conveying roller 44A than the end of the flap 44F shown in FIG. 3. The flap 44F in the state shown in FIG. 3 and the guiding surface 44G form a continuous curved surface. The flap 44F and the guiding surface 44G contact the second surface SH2 of a sheet SH conveyed along the curved path PC1 to guide the sheet SH along a curved path. The conveying roller 44A rotates in contact with the first surface SH1 of a sheet SH conveyed along the curved path PC1. The conveying roller 44A nips the sheet SH together with the pinch rollers 44P and 44Q in order to convey the sheet SH downstream in the conveying direction.

The conveying unit 4 also includes a pressing member 49 disposed on the lower path PB1 at a position above the upstream side of the reading surface 72A. An urging spring 49S presses the pressing member 49 against the top of a sheet SH conveyed along the lower path PB1 so that the sheet SH contacts the reading surface 72A.

The conveying unit 4 also includes a discharge roller 48A, and a pinch roller 48P disposed on the lower path PB1 at a position near the discharge tray 92. The discharge roller 48A and the pinch roller 48P nip a sheet SH that has passed over the reading surface 72A and discharge the sheet SH onto the discharge tray 92.

As shown in FIG. 4, the second conveying path P2 includes the upper path PA1 and an extension path PD1. The extension path PD1 is formed with the top surface of the flap 44F by pivoting the flap 44F clockwise in FIG. 3 from the state shown in FIG. 3 until the flap 44F is displaced to the orientation shown in FIG. 4. As shown in FIG. 4, the extension path PD1 follows a different direction than the curved path PC1 connected to the left end of the upper path PA1, and specifically branches leftward to extend the upper path PA1. In other words, the upper path branches to the curved path PC1 and the extension path PD1. The extension path PD1 extends leftward along the upward-facing surface of the open discharge cover 93.

When using the second conveying path P2, the conveying unit 4 conveys sheets SH from the upper path PA1 to the extension path PD1. At this time, the feeding roller 41, the sheet sensor 41S, the separating roller 42, the separating pad 42A, the conveying roller 43A, the pinch roller 43B, and the sheet sensor 43S operate as described above. With the second conveying path P2, the sheets SH are conveyed in a leftward direction along the upper path PA1 and the extension path PD1. In the second conveying path P2, the right end of the upper path PA1 is the upstream side in the conveying direction, and the left end of the extension path PD1 is the downstream side in the conveying direction.

In the preferred embodiment, the flap 44F is switched between the states shown in FIGS. 3 and 4 by a manual user operation or under control of the control unit 7. Specifically, the flap 44F is displaced to the position shown in FIG. 3 when opting to convey the sheet SH along the curved first conveying path P1, and is displaced to the position shown in FIG. 4 when opting to convey the sheet SH along the straight second conveying path P2.

Each of the first reading unit 31, the second reading unit 32, and the third reading unit 33 shown in FIGS. 3 and 4 is a well-known image sensor, such as a contact image sensor (CIS) or a charge coupled device (CCD). Each of the first reading unit 31, the second reading unit 32, and the third reading unit 33 has a plurality of reading elements arrayed in the front-rear direction.

The first reading unit 31 is disposed on the upper path PA1 at a position downstream of the sheet sensor 43S in the conveying direction. Further, the first reading unit 31 is disposed at a position below a sheet SH conveyed along the upper path PA1. Hence, when a sheet SH is conveyed along the upper path PA1, the first surface SH1 of the sheet SH faces downward and passes over the top of the first reading unit 31. Accordingly, the first reading unit 31 can read the first surface SH1 of the sheet SH conveyed thereabove.

The second reading unit 32 is disposed on the upper path PA1 at a position downstream of the sheet sensor 43S in the conveying direction and upstream of the first reading unit 31 in the conveying direction. Further, the second reading unit 32 is disposed at a position above a sheet SH being conveyed along the upper path PA1. Hence, when a sheet SH is conveyed along the upper path PA1, the second surface SH2 of the sheet SH faces upward and passes beneath the second reading unit 32. Accordingly, the second reading unit 32 can read the second surface SH2 of a sheet SH conveyed therebelow.

The third reading unit 33 is retained on the sliding mechanism 39 inside the body section 8. The sliding mechanism 39 has a structure that is well known in the art. The sliding mechanism 39 reciprocates the third reading unit 33 in the left-right direction along an underside surface 71B of the first platen glass 71 that is the opposite side from the supporting surface 71A. The third reading unit 33 can read an image from an original supported on the supporting surface 71A while moving along the underside surface 71B of the first platen glass 71.

The sliding mechanism 39 also moves the third reading unit 33 to a stationary reading position beneath the second platen glass 72. When halted in the stationary reading position, the third reading unit 33 confronts the lower path PB1 through the reading surface 72A of the second platen glass 72. Hence, in the stationary reading position the third reading unit 33 is positioned to confront a sheet SH being conveyed along the lower path PB1.

When a sheet SH is conveyed along the lower path PB1, the second surface SH2 of the sheet SH faces downward and passes over the top of the stationary third reading unit 33. At this time, the third reading unit 33 can read the second surface SH2 of the sheet SH conveyed along the lower path PB1.

Image sensors having the same resolution are used as the first reading unit 31, the second reading unit 32, and the third reading unit 33, but the front-rear dimension of the first reading unit 31 and the third reading unit 33 differs from that of the second reading unit 32. As shown in FIG. 5, the front-rear width W31 of the first reading unit 31 and the front-rear width W33 of the third reading unit 33 are set to a sufficient width for reading an image from the largest sheet SH that can be supported on the paper tray 91. However, the front-rear width W32 of the second reading unit 32 is set shorter than the front-rear width W31 of the first reading unit 31 and the front-rear width W33 of the third reading unit 33. That is, the front-rear width W32 of the second reading unit 32 is set to a length sufficient for reading images from smaller sheets SH supported on the paper tray 91, such as postcard-size sheets SH.

As shown in FIG. 2, the control unit 7 is a control circuit configured of a CPU 701 and the like. The control unit 7 uses various data stored in data storing means such as ROM 702 and RAM 703 to control the image-reading device 1.

More specifically, the operating panel 5 shown in FIG. 1 has a display unit 5A that includes a liquid crystal panel, and an operating unit 5B that includes a numeric keypad, buttons, and the like. The control unit 7 is connected to the display unit 5A and the operating unit 5B. The control unit 7 displays the operating status of the image-reading device 1, settings, and the like on the display unit 5A and receives operations inputted by the user on the operating unit 5B.

The control unit 7 controls the conveying unit 4 through a first drive circuit 7A. The control unit 7 can switch the conveying unit 4 between a first mode for conveying the sheets SH at a first speed, and a second mode for conveying sheets SH at a second speed faster than the first speed.

When the first mode is selected and the flap 44F is in the position shown in FIG. 3, the control unit 7 maintains the flap 44F in its current state. However, if the flap 44F is in the position shown in FIG. 4, the control unit 7 switches the flap 44F to the position shown in FIG. 3 to select the first conveying path P1. Next, the control unit 7 controls the rotational speed of a drive motor in the conveying unit 4 using the first drive circuit 7A in order to convey a sheet SH at the first speed.

On the other hand, if the second mode has been selected and the flap 44F is in the position shown in FIG. 4, the control unit 7 maintains the flap 44F in its current state. However, if the flap 44F is in the position shown in FIG. 3, the control unit 7 switches the flap 44F to the position shown in FIG. 4 in order to select the second conveying path P2. Next, the control unit 7 controls the rotational speed of the drive motor in the conveying unit 4 through the first drive circuit 7A in order to convey a sheet SH at the second speed.

The control unit 7 controls the sliding mechanism 39 through a second drive circuit 7B. The control unit 7 acquires detection results from the sheet sensor 41S and the sheet sensor 43S.

The control unit 7 controls the first reading unit 31, the second reading unit 32, and the third reading unit 33 to acquire data detected by each of their plurality of reading elements. Here, data detected by the first reading unit 31, the second reading unit 32, and the third reading unit 33 includes data other than image data for the first surface SH1 and the second surface SH2 of the sheet SH, i.e., data that is used in the image-reading process. More specifically, data that is used in the image-reading process may include the timing at which the leading edge of the sheet SH passes, the timing at which the trailing edge of the sheet SH passes, the skew angle of the sheet SH, the color of the sheet SH itself, and the front-rear width of the sheet SH.

Image-Reading Process

Figure 6:
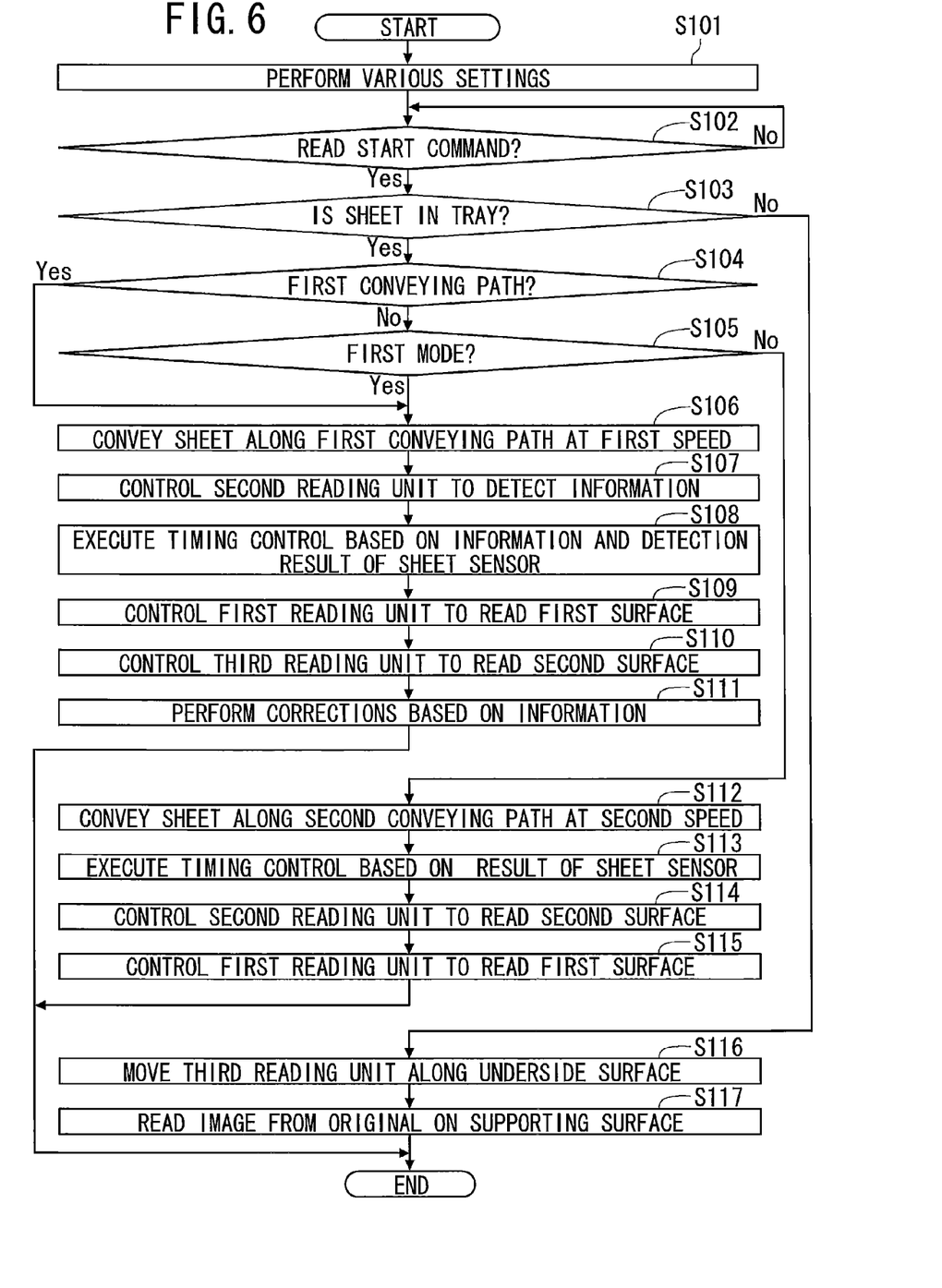
FIG. 6 is a flowchart illustrating a process performed by the image-reading device according to the first embodiment.

With the image-reading device 1 having the above configuration, the control unit 7 performs an image-reading process shown in FIG. 6 for reading images from the first surface SH1 and the second surface SH2 of a sheet SH in the paper tray 91 or for reading an image from an original supported on the supporting surface 71A of the first platen glass 71.

In S101 at the beginning of the image-reading process of FIG. 6, the control unit 7 performs various settings necessary for the image-reading process. The control unit 7 performs settings at this time to reflect user-input operations received through the display unit 5A and operating unit 5B, setting data acquired from an external data processor or the like, or settings data stored in ROM or the like, for example.

In S102 the control unit 7 determines whether a read start command was issued through an input operation by the user, a command transmitted from an external data processor, or the like. The command may include a user's selected mode that the user selects from among the first and second modes or information indicating that the third reading unit 33 reads an original supported on the supporting surface 71A. The control unit 7 continually repeats the determination in S102 while a command has not been received (S102: NO) and advances to S103 when a start command has been received (S102: YES).

In S103 the control unit 7 determines whether a sheet SH is supported on the paper tray 91. Here, the control unit 7 determines that a sheet SH is supported on the paper tray 91 when the sheet sensor 41S is on and determines that a sheet SH is not supported on the paper tray 91 when the sheet sensor 41S is off. The control unit 7 advances to S116 if the sheet sensor 41S is off (S103: NO) and advances to S104 if the sheet sensor 41S is on (S103: YES).

Upon advancing to S104, the control unit 7 determines whether the first conveying path P1 has been selected. The control unit 7 determines that the first conveying path P1 has been selected if the flap 44F is in the position (state) shown in FIG. 3 and determines that the first conveying path P1 has not been selected if the flap 44F is in the position (state) shown in FIG. 4. The control unit 7 advances to S106 if the flap 44F is in the position shown in FIG. 3 (S104: YES) and advances to S105 if the flap 44F is in the position shown in FIG. 4 (S104: NO).

When advancing to S105, the control unit 7 determines whether the first mode has been selected. This determination is made based on the command when the command includes the user's selected mode, for example. The control unit 7 advances to S112 if the first mode has not been selected (S105: NO) and advances to S106 if the first mode has been selected (S105: YES).

If the control unit 7 advances to S106 from either S104 or S105, the control unit 7 controls the conveying unit 4 to convey the sheet SH along the first conveying path P1 at the first speed. Here, if the process advances from S105 to S106, in S106 the control unit 7 switches the flap 44F to the position shown in FIG. 3 from the position shown in FIG. 4 before conveying the sheet SH.

In S107 the control unit 7 controls the second reading unit 32 to detect information for use in the image-reading process. Here, the second reading unit 32 is not used for reading an image from the sheet SH when the sheet SH is conveyed along the first conveying path P1 (the first mode is executed). As described below, the image is read by the first reading unit 31 and the third reading unit 33. Thus, the second reading unit 32 is used to detect the information. The information includes, for example, the timing at which the leading edge of the sheet SH is detected by the second reading unit 32, the timing at which the trailing edge of the sheet SH is detected by the second reading unit 32, the skew angle of the sheet SH, the hue of the sheet SH, and the front-rear width of the sheet SH.

In S108 the control unit 7 executes timing control for the image-reading process based on information for use in the image-reading process detected by the second reading unit 32 and detection results from the sheet sensor 43S. As an example, the control unit 7 calculates the timing at which the sheet SH passes the first reading unit 31 and the third reading unit 33 with precision based on at least one of the timing at which the leading edge of the sheet SH is detected by the second reading unit 32, the timing at which the trailing edge of the sheet SH is detected by the second reading unit 32, and the skew angle of the sheet SH and controls the read start and read end timings for the first reading unit 31 and the third reading unit 33, and the like.

In S109 the control unit 7 controls the first reading unit 31 to read an image from the first surface SH1 of the sheet SH.

In S110 the control unit 7 controls the third reading unit 33, halted in the stationary reading position, to read an image from the second surface SH2 of the sheet SH.

Note that step S110 is omitted when read settings indicate that only the first surface SH1 of the sheet SH is to be read, and step S109 is omitted when read settings indicate that only the second surface SH2 of the sheet SH is to be read.

In S111 the control unit 7 performs corrections and the like on image data for the first surface SH1 read by the first reading unit 31 and image data for the second surface SH2 read by the third reading unit 33 based on the data (information) to be used in the image-reading process detected by the second reading unit 32. Specifically, the control unit 7 performs calibration to eliminate skew in the image data for the first surface SH1 and the second surface SH2 based on the skew angle of the sheet SH detected by the second reading unit 32. Further, the control unit 7 corrects color tones in image data for the first surface SH1 and the second surface SH2 based on the hue of the sheet SH itself detected by the second reading unit 32. Further, if the front-rear width of the sheet SH detected by the second reading unit 32 is sufficiently shorter than the front-rear width W31 of the first reading unit 31 and the front-rear width W33 of the third reading unit 33, the control unit 7 omits the process related to reading elements of the first reading unit 31 and the third reading unit 33 that fall outside the first surface SH1 and the second surface SH2 so that these reading elements are not operated. Subsequently, the control unit 7 ends the image-reading process.

When advancing to S112 from S105, the control unit 7 determines that the second mode has been selected and controls the conveying unit 4 to convey a sheet SH along the second conveying path P2 at the second speed.

In S113 the control unit 7 executes timing control for the image-reading process based on detection results from the sheet sensor 43S.

In S114 the control unit 7 controls the second reading unit 32 to read an image from the second surface SH2 of the sheet SH.

In S115 the control unit 7 controls the first reading unit 31 to read an image from the first surface SH1 of the sheet SH.

Note that the control unit 7 skips S114 when read settings indicate that only the first surface SH1 of the sheet SH is to be read, and skips S115 when read settings indicate that only the second surface SH2 of the sheet SH is to be read. Subsequently, the control unit 7 ends the image-reading process.

On the other hand, when the process advances to S116 from S103, the control unit 7 determines that a read setting has been made for reading an original supported on the supporting surface 71A of the first platen glass 71. The control unit 7 controls the sliding mechanism 39 to move the third reading unit 33 to the stationary reading position beneath the second platen glass 72.

In S117 the control unit 7 moves the third reading unit 33 rightward while controlling the third reading unit 33 to read an image from the original supported on the supporting surface 71A of the first platen glass 71. Subsequently, the control unit 7 ends the image-reading process.

Operational Advantages

In the image-reading device 1 according to the first embodiment, the control unit 7 executes the image-reading process shown in FIG. 6. Therefore, when the image-reading device 1 conveys a sheet SH along the first conveying path P1 or the second conveying path P2, the image-reading device 1 may suitably select one or two of the first reading unit 31, the second reading unit 32, and the third reading unit 33 in order to properly read images from one or both sides of the sheet SH according to the user's needs.

More specifically, the control unit 7 selects one or two of the first reading unit 31, the second the reading unit 32, and the third reading unit 33 through the determinations in S103-S105 shown in FIG. 6.

When a read setting has been made to read an original supported on the supporting surface 71A, in 5117 the control unit 7 controls the third reading unit 33 to read an image of the original on the supporting surface 71A while moving the third reading unit 33.

If the second conveying path P2 has been selected or if the second mode was selected, in S114 and S115 the control unit 7 controls the first reading unit 31 and the second reading unit 32 to read images from one or both surfaces of the sheet SH being conveyed on the second conveying path P2.

When the first conveying path P1 has been selected or when the first mode has been selected, in S107 the control unit 7 uses the second reading unit 32, not being used for reading images from the sheet SH, to detect information needed for processing images read by the first reading unit 31 or the third reading unit 33. In S108 the control unit 7 executes timing control for the image-reading process based on the information detected by the second reading unit 32 for use in the image-reading process. In S109 and S110 the control unit 7 controls the first reading unit 31 and the third reading unit 33 to read images from one or both surfaces of the sheet SH conveyed along the first conveying path P1. In S111 the control unit 7 executes corrections and the like on images read by the first reading unit 31 and the third reading unit 33 based on the information detected by the second reading unit 32 for use in the image-reading process. In this way, the image-reading device 1 may use the second reading unit 32, not being used for reading images from the sheet SH, to execute timing control in the image-reading process and corrections and the like on the scanned images.

A particular feature of the image-reading device 1 according to the first embodiment is that light emitted from one of the first reading unit 31 and the third reading unit 33 when using the first reading unit 31 and the third reading unit 33 to read images from both surfaces of a sheet SH conveyed along the first conveying path P1 will not affect the other reading unit because the first reading unit 31 and the third reading unit 33 are disposed in separate positions along the upper path PA1 and the lower path PB1, respectively. Accordingly, the image-reading device 1 of the embodiment may suitably meet the needs of users desiring improved reading quality. Further, the image-reading device 1 may reduce the time required to read both surfaces of a sheet SH conveyed along the second conveying path P2 by using the first reading unit 31 and the second reading unit 32, both of which are provided on the upper path PA1, because the conveying distance of the second conveying path P2 is shorter than that of the first conveying path P1 by the length of the curved path PC1.

Consequently, the image-reading device 1 according to the first embodiment may produce scanned images from sheets SH with consistent quality while sufficiently meeting user needs, such as providing the first conveying path P1 and the second conveying path P2. The image-reading device 1 may also properly read images from an original supported on the supporting surface 71A using the third reading unit 33.

Further, the image-reading device 1 may be made smaller by reducing the number of sensors like the sheet sensor 43S needed to detect the position of sheets SH conveyed on the conveying path when performing timing control in the image-reading process using the second reading unit 32, which is not used to read an image from the sheet SH. Further, the simple flap 44F may be used in the image-reading device 1 to suitably switch the path for conveying sheets SH between the first conveying path P1 and the second conveying path P2.

In the image-reading device 1 according to the embodiment, information used in the image-reading process includes at least one of the timing at which the leading edge of the sheet SH passes, the timing at which the trailing edge of the sheet SH passes, the skew angle of the sheet SH, the color (hue) of the sheet SH itself, and the front-rear width of the sheet SH. By effectively using such information in the image-reading process, the image-reading device 1 may reliably implement timing control in the image-reading process and corrections and the like on the scanned image.

In the image-reading device 1 according to the embodiment, the second reading unit 32 is positioned upstream of the first reading unit 31 in the direction that the sheet SH is conveyed. If the second reading unit 32 were positioned downstream of the first reading unit 31 in the conveying direction, the first reading unit 31 would begin reading the sheet SH when the second reading unit 32 is detecting information for use in the image-reading process. Accordingly, processing of image data is delayed because timing control in the image-reading process and calibrations and the like on the scanned images based on information detected by the second reading unit 32 cannot be performed until after image data read by the first reading unit 31 is collected in a buffer, such as RAM, and the second reading unit 32 detects information for use in the image-reading process. For this reason, the second reading unit 32 in the image-reading device 1 according to the embodiment positioned upstream in the conveying direction detects information for the image-reading process in S107 before the first reading unit 31 begins reading an image in S109, allowing the timing control in the image-reading process for image data read by the first reading unit 31 and corrections and the like on the scanned image to begin earlier. As a result, the image-reading device 1 may simplify processes for timing control in the image-reading process and corrections and the like on the scanned images.

As shown in FIG. 5, the front-rear width W32 of the second reading unit 32 is shorter than the front-rear width W31 of the first reading unit 31 and the front-rear width W33 of the third reading unit 33 in the image-reading device 1 according to the embodiment. Since this configuration reduces the number of reading elements possessed by the second reading unit 32, the cost of parts for the image-reading device 1 may be reduced. For sheets SH that are wider than the second reading unit 32 in the front-rear direction, the first reading unit 31 and the third reading unit 33 may read images from one or both surfaces of the sheet SH.

In S106 of FIG. 6, the control unit 7 controls the conveying unit 4 to convey a sheet SH along the first conveying path P1 at a first speed for the first mode, and in S112 controls the conveying unit 4 to convey a sheet SH along the second conveying path P2 at a second speed, faster than the first speed, for the second mode. Since the image-reading device 1 may convey a sheet SH along the second conveying path P2, which does not include the curved path PC1, in the second mode, the image-reading device 1 may convey the sheet SH more suitably than when conveying a sheet SH on the first conveying path P1, which includes the curved path PC1, at the second speed. Further, since the conveying distance is shorter on the second conveying path P2 than on the first conveying path P1 that includes the curved path PC1, the time required from feeding to discharging a sheet SH is shorter using the second conveying path P2 than the first conveying path P1. Hence, this configuration improves convenience for the user by greatly reducing the time required in the second mode from the time required in the first mode.

Second Embodiment

Figure 7:
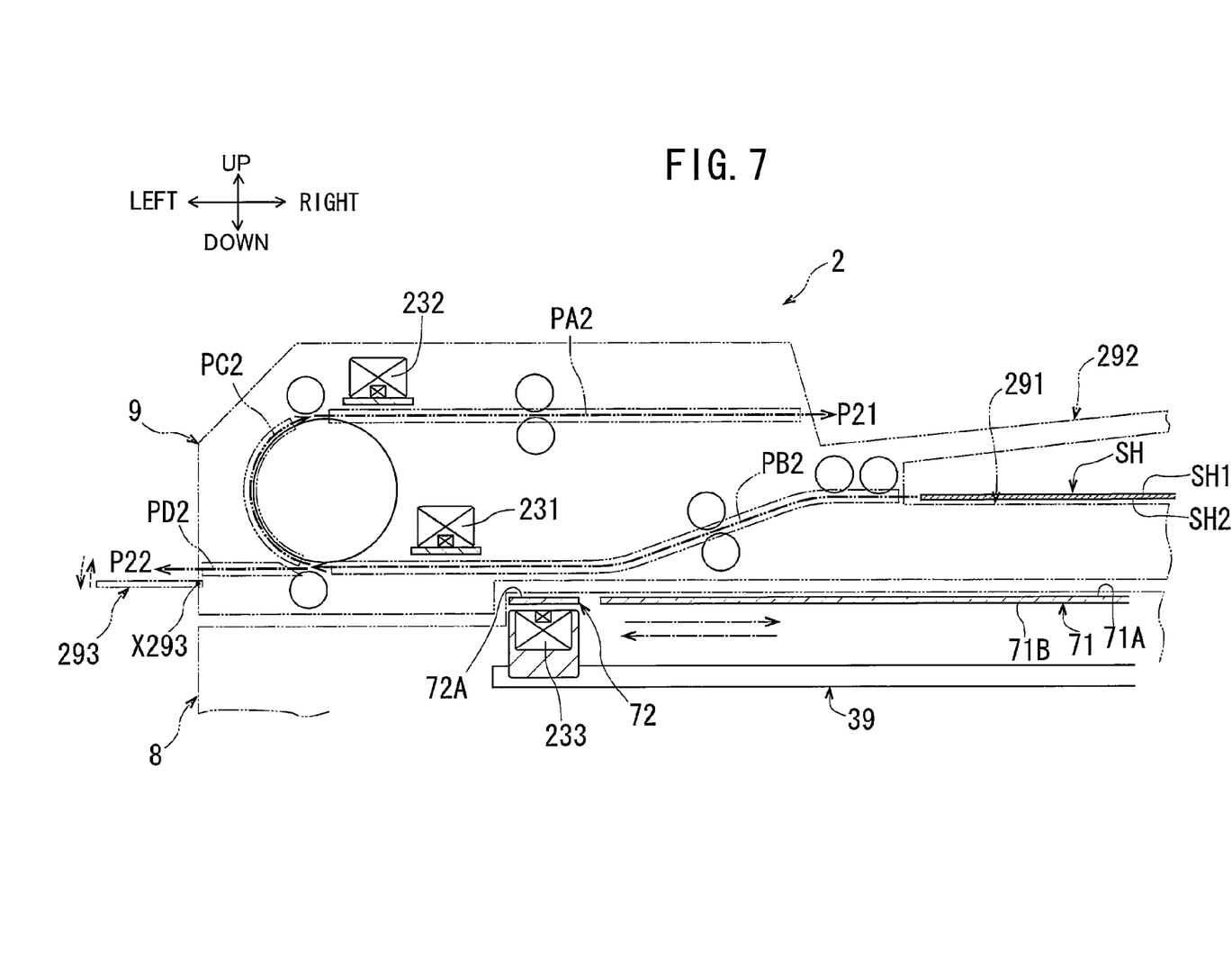
FIG. 7 is a illustrative diagram illustrating a first and second conveying path of an image-reading device according to a second embodiment.

FIG. 7 shows an image-reading device 2 according to a second embodiment. The image-reading device 2 according to the second embodiment uses a paper tray 291, a discharge tray 292, and a discharge cover 293 that are arranged with different relative positions from the paper tray 91, the discharge tray 92, and the discharge cover 93 in the image-reading device 1 according to the first embodiment. The image-reading device 2 according to the second embodiment also employs a first conveying path P21 and a second conveying path P22 having different relative positions than the first conveying path P1 and second conveying path P2 in the first embodiment. The image-reading device 2 also uses a first reading unit 231, a second reading unit 232, and a third reading unit 233 having different relative positions from the first reading unit 31, second reading unit 32, and third reading unit 33 in the first embodiment. The remaining structure of the image-reading device 2 according to the second embodiment is identical to the image-reading device 1 in the first embodiment, and, thus, structures identical to those described in the first embodiment have been omitted from the drawings and like parts and components are designated with the same reference numerals to avoid duplicating description.

As shown in FIG. 7, the paper tray 291 is provided on the right side of the pivoting section 9. The paper tray 291 supports sheets SH to be read when a plurality of sheets is being conveyed and read. The upward-facing surface of a sheet SH supported on the paper tray 291 is called the first surface SH1, while the downward-facing surface of the sheet SH is called the second surface SH2. The discharge tray 292 is provided on the right side of the pivoting section 9 above the paper tray 291. The discharge cover 293 is supported on the left side of the pivoting section 9 so as to be capable of pivoting about an axis X293 aligned in the front-rear direction. In its open state, the discharge cover 293 is substantially horizontal and extends leftward from the pivoting section 9.

While not shown in the drawings, the image-reading device 2 is provided with a conveying unit having a structure that is substantially reversed vertically from the structure of the conveying unit 4 according to the first embodiment to support the discharge tray 292 being provided above the paper tray 291. The first conveying path P21 and the second conveying path P22 are defined in the conveying unit (not shown).

The first conveying path P21 includes an upper path PA2, a lower path PB2 positioned below the upper path PA2, and a curved path PC2 connecting the upper path PA2 to the lower path PB2. The lower path PB2 extends along a general horizontal direction from the paper tray 291 to the left side of the pivoting section 9. More specifically, the lower path PB2 slopes downward from the paper tray 291 so as to approach the second platen glass 72, and then extends leftward and substantially horizontally along the reading surface 72A of the second platen glass 72. The upper path PA2 is positioned above the lower path PB2. The upper path PA2 extends from the left side of the pivoting section 9 to the discharge tray 292. The curved path PC2 connects the left end of the upper path PA2 to the left end of the lower path PB2 while curving so as to protrude leftward. The upper path PA2 overlaps with the lower path PB2 in the vertical direction.

When using the first conveying path P21, the conveying unit (not shown) conveys sheets SH from the lower path PB2 to the upper path PA2 via the curved path PC2. With the first conveying path P21, sheets SH are conveyed in a leftward direction along the lower path PB2, reversed from left to right on the curved path PC2, and conveyed rightward on the upper path PA2. Thus, the right side of the lower path PB2 is the upstream side in the conveying direction, while the right side of the upper path PA2 is the downstream side in the conveying direction.

The second conveying path P22 includes the lower path PB2, and an extension path PD2. The extension path PD2 is connected to the left end of the lower path PB2 and branches off in a direction different from the curved path PC2. In other words, the lower path PB2 branches to the curved path PC2 and the extension path PD2. That is, the lower path PB2 branches leftward to extend the lower path PB2. The extension path PD2 extends leftward along the upward-facing surface of the open discharge cover 293.

When using the second conveying path P22, the conveying unit (not shown) conveys sheets SH from the lower path PB2 to the extension path PD2. With the second conveying path P22, sheets SH are conveyed in a leftward direction along the lower path PB2 and the extension path PD2. In the second conveying path P22, the right end of the lower path PB2 is the upstream side in the conveying direction, and the left end of the extension path PD2 is the downstream side in the conveying direction.

In the second embodiment, the first reading unit 231 is disposed on the lower path PB2. Further, the first reading unit 231 is disposed at a position above sheets SH conveyed along the lower path PB2. Hence, when a sheet SH is conveyed along the lower path PB2, the first surface SH1 of the sheet SH faces upward and passes beneath the first reading unit 231.

Accordingly, the first reading unit 231 may read the first surface SH1 of the sheet SH conveyed therebelow.

The second reading unit 232 is disposed on the upper path PA2. Further, the second reading unit 232 is disposed at a position above a sheet SH conveyed along the upper path PA2. Hence, when a sheet SH is conveyed along the upper path PA2, the second surface SH2 of the sheet SH faces upward and passes beneath the second reading unit 232. Accordingly, the second reading unit 232 may read the second surface SH2 of the sheet SH conveyed therebelow.

The third reading unit 233 is retained on the sliding mechanism 39 inside in the body section 8. The sliding mechanism 39 reciprocates the third reading unit 233 in the left-right direction along the underside surface 71B of the first platen glass 71 that is the opposite side from the supporting surface 71A. The third reading unit 233 may read an image from an original supported on the supporting surface 71A while moving along the underside surface 71B of the first platen glass 71.

The sliding mechanism 39 also moves the third reading unit 233 to a stationary reading position beneath the second platen glass 72. When halted in the stationary reading position, the third reading unit 233 confronts the lower path PB2 through the reading surface 72A of the second platen glass 72. Hence, in the stationary reading position, the third reading unit 233 is positioned to confront a sheet SH being conveyed along the lower path PB2. The third reading unit 233 is also disposed at a position on the lower path PB2 upstream of the first reading unit 231 in the conveying direction.

When a sheet SH is conveyed along the lower path PB2, the second surface SH2 of the sheet SH faces downward and passes over the top of the stationary third reading unit 233. At this time, the third reading unit 233 may read the second surface SH2 of the sheet SH being conveyed along the lower path PB2.

Image sensors having the same resolution are used as the first reading unit 231, the second reading unit 232, and the third reading unit 233. Further, the front-rear widths of the first reading unit 231, the second reading unit 232, and the third reading unit 233 are all set equivalent to the front-rear width W31 of the first reading unit 31 and the front-rear width W33 of the third reading unit 33 in the first embodiment.

Though not shown in FIG. 7, the flap 44F is disposed at a left and lower side of the conveying roller 44A in order to switch between the curved path PC2 and the extension path PD2.

Image-Reading Process

Figure 8:
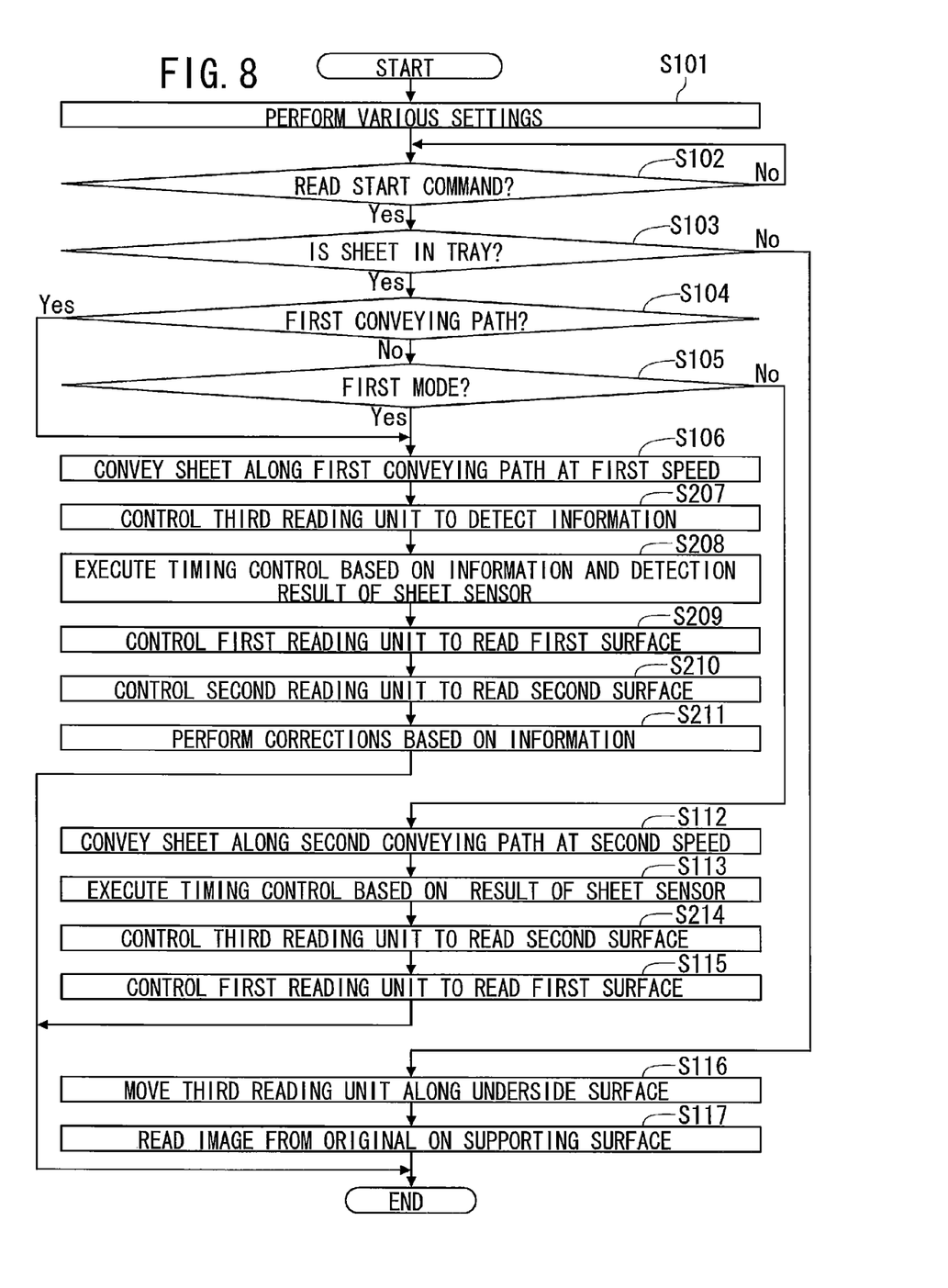
FIG. 8 is a flowchart illustrating a process performed by the image-reading device according to the second embodiment.

With the image-reading device 2 having the above configuration, the control unit 7 performs an image-reading process shown in FIG. 8 for reading images from the first surface SH1 and the second surface SH2 of a sheet SH in the paper tray 291 or for reading an image from an original supported on the supporting surface 71A of the first platen glass 71. The image-reading process in FIG. 8 is identical to the image-reading process according to the first embodiment shown in FIG. 6, except that steps S107-S111 and S114 in the first embodiment have been replaced with steps S207-S211 and S214. Accordingly, the following description will not include a description of steps other than S207-S211 and S214.

In S106 of FIG. 8, the control unit 7 controls the conveying unit 4 to convey the sheet SH along the first conveying path P21 at the first speed.

In S207 the control unit 7 controls the third reading unit 233, halted in the stationary reading position, to detect information for use in the image-reading process. The details of the information is given in S107 of the first embodiment.

In S208 the control unit 7 executes timing control for the image-reading process based on information for use in the image-reading process detected by the third reading unit 233, which is not used for reading an image from the sheet SH, and detection results from the sheet sensor (not shown) that is provided upstream side of the stationary third reading unit 233 in the conveying direction similarly to the sheet sensor 43S. A specific example of this process is given in the description of S108 in the first embodiment.

In S209 the control unit 7 controls the first reading unit 231 to read an image from the first surface SH1 of the sheet SH.

In S210 the control unit 7 controls the second reading unit 232 to read an image from the second surface SH2 of the sheet SH.

In S211 the control unit 7 performs corrections and the like on image data for the first surface SH1 read by the first reading unit 231 and image data for the second surface SH2 read by the second reading unit 232, based on the data for use in the image-reading process detected by the third reading unit 233. A specific example of this process is given in the description of S111 in the first embodiment. Subsequently, the control unit 7 ends the image-reading process.

However, when advancing to S112, the control unit 7 controls the conveying unit 4 to convey a sheet SH along the second conveying path P22 at the second speed, and subsequently executes the process in S113, as in the first embodiment.

In S214 the control unit 7 controls the third reading unit 233, halted in the stationary reading position, to read an image from the second surface SH2 of the sheet SH.

In S115 the control unit 7 controls the first reading unit 231 to read an image from the first surface SH1 of the sheet SH. Subsequently, the control unit 7 ends the image-reading process.

Operational Advantages

In the image-reading device 2 according to the second embodiment, the control unit 7 executes the image-reading process shown in FIG. 8. Therefore, when the image-reading device 2 conveys a sheet SH along the first conveying path P21 or the second conveying path P22, the image-reading device 2 may suitably select one or two of the first reading unit 231, the second reading unit 232, or the third reading unit 233 in order to properly read images from one or both sides of the sheet SH according to the user's needs.

More specifically, the control unit 7 selects one or two of the first reading unit 231, the second reading unit 232, and the third reading unit 233 through the determinations in S103-S105 shown in FIG. 8.

When a read setting has been made to read an original supported on the supporting surface 71A, in S117 the control unit 7 controls the third reading unit 233 to read an image of the original on the supporting surface 71A while the third reading unit 233 is moved.

If the second conveying path P22 has been selected or if the second mode has been selected, in S214 and S115 the control unit 7 controls the first reading unit 231 and the third reading unit 233 to read images from one or both sides of the sheet SH being conveyed on the second conveying path P22.

When the first conveying path P21 has been selected or when the first mode has been selected, in S207 the control unit 7 uses the third reading unit 233, not being used for reading images from the sheet SH, to detect information for use when processing images read by the first reading unit 231 or the second reading unit 232. In S208 the control unit 7 executes timing control for the image-reading process based on information detected by the third reading unit 233 for use in the image-reading process. In S209 and S210 the control unit 7 controls the first reading unit 231 and the second reading unit 232 to read images from one or both surfaces of the sheet SH conveyed along the first conveying path P21. In S211 the control unit 7 executes corrections and the like on images read by the first reading unit 231 and the second reading unit 232 based on the information detected by the third reading unit 233 for use in the image-reading process. In this way, the image-reading device 2 may use the third reading unit 233, not being used for reading images from the sheet SH, to execute timing control in the image-reading process and corrections and the like on the scanned images.

A particular feature of the image-reading device 2 according to the second embodiment is that light emitted from one of the first reading unit 231 and the second reading unit 232 when using the first reading unit 231 and the second reading unit 232 to read images from both surfaces of a sheet SH conveyed along the first conveying path P21 will not affect the other reading unit because the first reading unit 231 and the second reading unit 232 are disposed in separate positions along the lower path PB2 and the upper path PA2, respectively. Accordingly, the image-reading device 2 of the embodiment may suitably meet the needs of users desiring improved reading quality. Further, the image-reading device 2 may reduce the time required to read both surfaces of a sheet SH conveyed along the second conveying path P22 by using the first reading unit 231 and third reading unit 233 because the conveying distance of the second conveying path P22 is shorter than that of the first conveying path P21 by the length of the curved path PC2 and both the first reading unit 231 and the third reading unit 233 are provided on the lower path PB2.

Consequently, the image-reading device 2 according to the second embodiment may produce scanned images from sheets SH with consistent quality while sufficiently meeting user needs, such as providing the first conveying path P21 and second conveying path P22. The image-reading device 2 may also properly read images from an original supported on the supporting surface 71A using the third reading unit 233.

Further, the image-reading device 2 may be made smaller by reducing the number of sensors needed to detect the position of sheets SH conveyed on the conveying path when performing timing control in the image-reading process using the third reading unit 233, which is not used to read an image from the sheet SH when conveyed along the first conveying path P21.

In the image-reading device 2 according to the second embodiment described above, the third reading unit 233 halted in the stationary reading position is positioned upstream of the first reading unit 231 in the direction that the sheet SH is conveyed. In this way, the third reading unit 233 halted in the stationary reading position detects information for use in the image-reading process before the first reading unit 231 begins reading an image. This enables the image-reading device 2 to begin timing control in the image-reading process for image data read by the first reading unit 231 and to begin corrections and the like on the scanned image earlier. As a result, the image-reading device 2 may simplify processes for timing control in the image-reading process and corrections and the like on the scanned images.

Third Embodiment

In an image-reading device according to a third embodiment, modifications described below have been made to the first reading unit 31, the second reading unit 32, the third reading unit 33, and the control unit 7 in the image-reading device 1 according to the first embodiment. The remaining structures in the third embodiment are identical to those in the first embodiment and, hence, drawings for the third embodiment have been omitted.

In the third embodiment, image sensors having the same resolution are used as the first reading unit 31 and the second reading unit 32 of the image-reading device 1, while an image sensor having a higher resolution than the first reading unit 31 and the second reading unit 32 is used as the third reading unit 33. Further, the front-rear width W32 of the second reading unit 32 is made longer than that in the first embodiment. That is, in the third embodiment, the front-rear width W32 is equivalent to both the front-rear width W31 of the first reading unit 31 and the front-rear width W33 of the third reading unit 33.

Owing to the above modifications, the control unit 7 according to the third embodiment is capable of executing the following image-reading process, for example. Specifically, when reading both surfaces of a sheet SH while conveying the sheet SH along the first conveying path P1 at a high speed, the control unit 7 controls the first reading unit 31 and the second reading unit 32 to read images from the surfaces of the sheet SH. However, when reading only the second surface SH2 of a sheet SH conveyed along the first conveying path P1 at a low speed, the control unit 7 controls the third reading unit 33 to read an image of the second surface SH2.

The image-reading device according to the third embodiment having the structure described above may obtain the same operational advantages described for the image-reading device 1 according to the first embodiment.

Since the image-reading device of the third embodiment uses images sensors having the same resolution as the first reading unit 31 and the second reading unit 32, both of which are disposed on the upper path PA1, when reading two sides of a sheet SH conveyed along the second conveying path P2, the present invention may ensure that the reading quality for the image on the first surface SH1 read by the first reading unit 31 is equivalent to the reading quality of the image for the second surface SH2 read by the second reading unit 32. Further, since the front-rear width W32 of the second reading unit 32 is equivalent to the front-rear width W31 of the first reading unit 31 in this image-reading device, the image-reading device may read images from both surfaces of a maximum-sized sheet SH supported on the paper tray 91 using the first reading unit 31 and the second reading unit 32.

Further, when the image-reading device according to the third embodiment reads an image from only the second surface SH2 of the sheet SH conveyed along the first conveying path P1, the image-reading device may read an image of the second surface SH2 using the third reading unit 33, which has a higher resolution than the first reading unit 31 and the second reading unit 32, thereby improving the reading quality for the image of the second surface SH2.

Fourth Embodiment

In a fourth embodiment, the image-reading device 2 is modified such that the front-rear width of the second reading unit 232 is equivalent to the front-rear width W32 according to the first embodiment. In other words, the second reading unit 232 according to the fourth embodiment is shorter in its front-rear dimension than the first reading unit 231 and the third reading unit 233. The remaining structure of the image-reading device 2 according to the fourth embodiment is identical to that in the second embodiment and, hence, drawings for the fourth embodiment have been omitted.

The image-reading device according to the fourth embodiment having the structure described above may obtain the same operational advantages as the image-reading device 2 described in the second embodiment.

Further, the structure in the fourth embodiment may reduce the cost of parts used in the image-reading device since the number of reading elements possessed by the second reading unit 232 may be reduced when forming the second reading unit 232 shorter than the first reading unit 231 and the third reading unit 233. The first reading unit 231 and the third reading unit 233 may read images from one or both surfaces of sheets SH that are wider than the second reading unit 232 in the front-rear direction.

While the invention has been described in detail with reference to first through fourth embodiments thereof, it would be apparent to those skilled in the art that many modifications and variations may be made therein without departing from the scope of the invention, the scope of which is defined by the attached claims.

What is claimed is:

1. An image-reading device comprising:
a conveyor configured to convey an original sheet having a first surface and a second surface opposite to the first surface, the conveyor having:
an upper path;
a lower path disposed below the upper path;
a curved path connecting the upper path and the lower path; and
an extension path being connected to the upper path, the upper path branching to the curved path and the extension path, a first path being defined by a path from the upper path to the lower path via the curved path, a second path being defined by a path from the upper path to the extension path,
a reading section configured to read the original sheet and having:
a first reading unit disposed on the upper path and configured to read the first surface while the original sheet is on the upper path;
a second reading unit disposed on the upper path and configured to read the second surface while the original sheet is on the upper path; and
a third reading unit disposed on the lower path and configured to read the second surface while the original sheet is on the lower path,
wherein when the reading section reads the original sheet, the conveyor conveys the original sheet through the first path or the second path.

2. The image-reading device according to claim 1, further comprising a switching unit configured to switch a conveying path to one of the first path and the second path, the conveyor conveying the original sheet through the switched conveying path.

3. The image-reading device according to claim 1, further comprising a control section configured to control the reading section to selectively perform a first read in which only the first surface is read, a second read in which only the second surface is read, and a third read in which both the first surface and the second surface are read,
wherein when the third read is performed on the original sheet conveyed through the first path, the control section controls the first reading unit to read the first surface and control one of the second reading unit and the third reading unit to read the second surface,
wherein when the third read is performed on the original sheet conveyed through the second path, the control section controls the first reading unit to read the first surface and control the second reading unit to read the second surface.

4. The image-reading device according to claim 3, wherein when the third read is performed on the original sheet conveyed through the first path, the control section controls the third reading unit to read the second surface and control the second reading unit to detect data that is to be used in the third read.

5. The image-reading device according to claim 4, wherein the conveyor conveys the original sheet in a conveying direction,
wherein the data represents one of a timing at which the second reading unit detects a leading edge of the original sheet, a timing at which the second reading unit detects a trailing edge of the original sheet, a skewing angle of the original sheet by which the original sheet is skewed from a widthwise direction perpendicular to the conveying direction, hue of sheet material of the original sheet, and a length of the original sheet in the widthwise direction.

6. The image-reading device according to claim 4, wherein the conveyor conveys the original sheet in a conveying direction,
wherein the second reading unit is disposed upstream of the first reading unit in the conveying direction.

7. The image-reading device according to claim 1, wherein the conveyor conveys the original sheet in a conveying direction,
wherein a length of the second reading unit in a widthwise direction orthogonal to the conveying direction is shorter than a length of the third reading unit in the widthwise direction.

8. The image-reading device according to claim 1, further comprising:
a supporting unit disposed below the lower path and having a supporting surface and an opposite surface opposite to the supporting surface, the supporting surface being configured to support the second surface of the original sheet therebelow,
a reciprocating mechanism configured to reciprocate the third reading unit along the opposite surface,
wherein the third reading unit is configured to read the second surface while the reciprocating mechanism reciprocates the third reading unit.

9. The image-reading device according to claim 1, wherein the control section is configured to selectively change a conveying mode from among a first mode and a second mode, the conveyor conveying the original sheet in a first speed in the first mode and conveying the original sheet in a second speed faster than the first speed in the second mode,
wherein in the first mode the conveyor conveys the original sheet through the first path whereas in the second mode the conveyor conveys the original sheet through the second path.

10. An image-reading device comprising:
a conveyor configured to convey an original sheet having a first surface and a second surface opposite to the first surface, the conveyor having:
an upper path;
a lower path disposed below the upper path;
a curved path connecting the upper path and the lower path; and
an extension path being connected to the lower path, the lower path branching to the curved path and the extension path, a first path being defined by a path from the lower path to the upper path via the curved path, a second path being defined by a path from the lower path to the extension path, a reading section having:
a first reading unit disposed on the lower path and configured to read the first surface while the original sheet is on the lower path;
a second reading unit disposed on the upper path and configured to read the second surface while the original sheet is on the upper path; and
a third reading unit disposed on the lower path and configured to read the second surface while the original sheet is on the lower path, wherein when the reading section reads the original sheet, the conveyor conveys the original sheet through the first path or the second path.

11. The image-reading device according to claim 10, further comprising a switching unit configured to switch a conveying path to one of the first path and the second path, the conveyor conveying the original sheet through the switched conveying path.

12. The image-reading device according to claim 10, further comprising a control section configured to control the reading section to selectively perform a first read in which only the first surface is read, a second read in which only the second surface is read, and a third read in which both the first surface and the second surface are read,
wherein when the third read is performed on the original sheet conveyed through the first path, the control section controls the first reading unit to read the first surface and control one of the second reading unit and the third reading unit to read the second surface,
wherein when the third read is performed on the original sheet conveyed through the second path, the control section controls the first reading unit to read the first surface and control the third reading unit to read the second surface.

13. The image-reading device according to claim 12, wherein when the third read is performed on the original sheet conveyed through the first path, the control section controls the second reading unit to read the second surface and control the third reading unit to detect data that is to be used in the third read.

14. The image-reading device according to claim 12, wherein the conveyor conveys the original sheet in a conveying direction,
wherein the data represents one of a timing at which the second reading unit detects a leading edge of the original sheet, a timing at which the second reading unit detects a trailing edge of the original sheet, a skewing angle of the original sheet by which the original sheet is skewed from a widthwise direction perpendicular to the conveying direction, hue of sheet material of the original sheet, and a length of the original sheet in the widthwise direction.

15. The image-reading device according to claim 13, wherein the conveyor conveys the original sheet in the conveying direction,
wherein the third reading unit is disposed upstream of the first reading unit in the conveying direction.

16. The image-reading device according to claim 10, wherein the conveyor conveys the original sheet in a conveying direction,
wherein a length of the second reading unit in a widthwise direction orthogonal to the conveying direction is shorter than a length of the third reading unit in the widthwise direction.

17. The image-reading device according to claim 10, further comprising:
a supporting unit disposed below the lower path and having a supporting surface and an opposite surface opposite to the supporting surface, the supporting surface being configured to support the second surface of the original sheet therebelow,
a reciprocating mechanism configured to reciprocate the third reading unit along the opposite surface,
wherein the third reading unit is configured to read the second surface while the reciprocating mechanism reciprocates the third reading unit.

18. The image-reading device according to claim 10, wherein the control section is configured to selectively change a conveying mode from among a first mode and a second mode, the conveyor conveying the original sheet in a first speed in the first mode and conveying the original sheet in a second speed faster than the first speed in the second mode,
wherein in the first mode the conveyor conveys the original sheet through the first path whereas in the second mode the conveyor conveys the original sheet through the second path.

19. An image-reading device comprising:
a conveyor configured to convey an original sheet, the conveyor having:
a common path;
a curved path being connected to the common path; and
a first path connected to the curved path, at least a part of the first path overlapping with at least a part of the common path with respect to a vertical direction;
a second path connected to the common path and extending in a direction different from the curved path from the common path, the conveyor selectively performing a first conveyance and a second conveyance, wherein in the first conveyance the original sheet is conveyed from the common path to the first path via the curved path, and in the second conveyance the original sheet is conveyed from the common path to the second path;
a reading section configured to read the original sheet and having a first reading unit, a second reading unit, and a third reading unit,
wherein the first reading unit and the second reading unit being positioned with the common path interposed therebetween, and displaced in a direction in which the original sheet is conveyed, the first reading unit and the second reading unit reading the original sheet on the common path,
wherein the third reading unit is disposed on the first path.

20. The image-reading device according to claim 19, wherein the conveyor further having:
a supporting part configured to support a plurality of original sheets;
a separation part configured to separate one sheet from the plurality of original sheets supported on the supporting part; and
a conveyance roller defining the curved path,
wherein both the first reading unit and the second reading unit are positioned between the separation part and the conveyance roller.

* * * * *

UNITED STATES PATENT AND TRADEMARK OFFICE
CERTIFICATE OF CORRECTION

PATENT NO. : 9,013,769 B1  
APPLICATION NO. : 14/506880  
DATED : April 21, 2015  
INVENTOR(S) : Osakabe Page 1 of 1

It is certified that error appears in the above-identified patent and that said Letters Patent is hereby corrected as shown below:

On the title page item [30], insert

-- Foreign Application Priority Data

Oct. 7, 2013    (JP) .................................... 2013-209822 --

Signed and Sealed this
Ninth Day of February, 2016

Michelle K. Lee
*Director of the United States Patent and Trademark Office*